Jan. 3, 1967     R. H. BUSH ETAL     3,295,670
TALKING MATCH BOOK
Filed Oct. 1, 1965
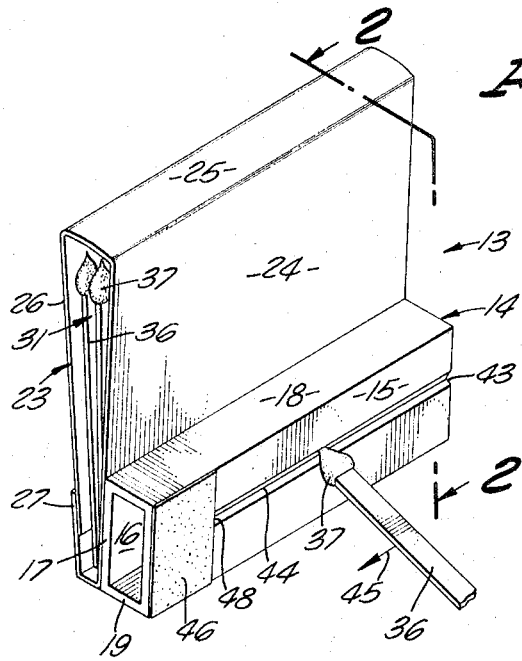
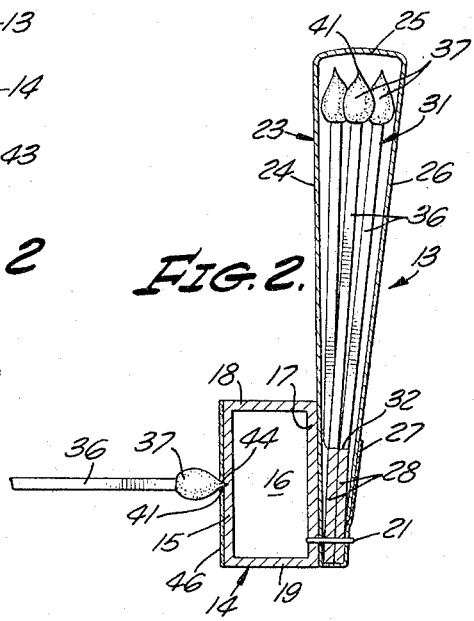
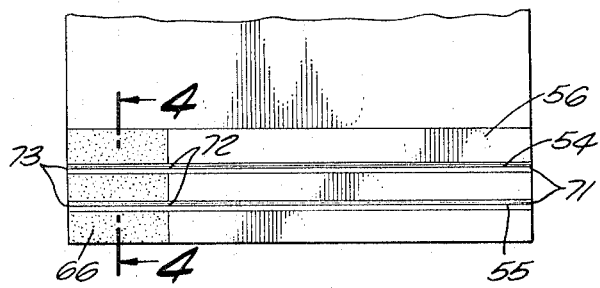
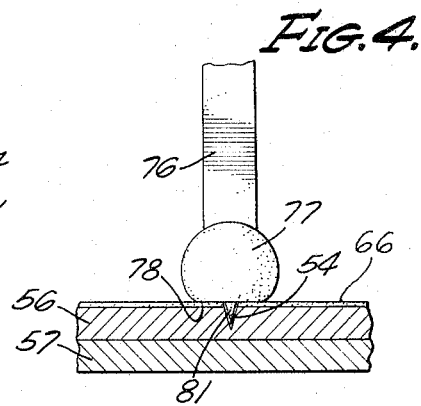
RICHARD H. BUSH
HOMER C. JONES
INVENTORS.
BY *Lothrop & West*
ATTORNEYS

United States Patent Office 3,295,670
Patented Jan. 3, 1967

3,295,670
TALKING MATCH BOOK
Richard H. Bush, 3249 O'Farrell Drive, Sacramento, Calif. 95815; and Homer C. Jones, 3722 Laura Court, Sacramento, Calif. 95821
Filed Oct. 1, 1965, Ser. No. 492,036
6 Claims. (Cl. 206—29)

The invention generally relates to paper match books, and, more particularly, to match books with one or more sound tracks and an associated ignition zone formed thereon with which a combination combustible match head and sharp stylus member can cooperate to reproduce audible sounds and to light the match in one sweep thereof.

This device is a novelty item and has as one of its major objects the audible reproduction of a short advertising or educational message each time a match is struck. For example, each book, or box, of matches could have a pair of parallel sound tracks thereon. In one track, the message could say, "Smokey the Bear," in the other, "Break Your Match."

It is another object of the invention to provide a match book in which the remaining, unused matches are well shielded from the match being ignited.

It is a further object of the invention to provide a novelty match item which is inexpensive and which takes up but little more room than the match books or containers heretofore in use.

It is an additional object of the invention to provide a match which is highly reliable in ignition.

It is another object of the invention to provide a generally improved talking match book.

Other objects, together with the foregoing, are attained in the embodiments described in the following description and shown in the accompanying drawings in which:

FIGURE 1 is a perspective view of one form of the device;

FIGURE 2 is a transverse sectional view of FIGURE 1 to an enlarged scale, the plane of the section being indicated by the line 2—2 in FIGURE 1;

FIGURE 3 is a fragmentary, front elevational view of a variant form of sound track and ignition strip; and, FIGURE 4 is a transverse, fragmentary, sectional view of FIGURE 3, to an enlarged scale showing the head end of a match and associated stylus disposed within a terminal portion of the sound track, the plane of the section being indicated by the line 4—4 in FIGURE 3.

While the talking match book of the invention is susceptible of numerous physical embodiments, including match boxes of the "kitchen," or other wooden match splint variety, it has been incorporated in the forms shown and described herein and has performed in an eminently satisfactory manner.

The talking match book of the invention, generally designated by the reference numeral 13, comprises an elongated hollow box 14 including an outer panel 15 having suitable properties enabling it to act as a diaphragm capable of transmitting sound vibrations to an internal sound chamber 16. The chamber 16 is defined by the diaphragm member 15 on the front, by a panel 17 on the rear and by a top panel 18 and bottom panel 19. The exposed portions of the panels 18 and 19 are well suited for printing thereon a message of an educational or advertising nature.

Mounted on the rear panel 17, as by staples 21, or other appropriate fasteners, is a match book, characterized generally by the reference numeral 23. The match book 23 is similar in many respects to the kind heretofore used, and includes a vertical panel 24 bent over at its upper end to form a top portion 25 and a downwardly depending flap 26, the bottom of the flap 26 being removably confined in an upward projection 27 recurving upwardly around the bottom of a match base mounting strip 28.

Projecting upwardly from the match base 28 is a plurality of matches, generally designated by the reference numeral 31, the individual matches being joined to the base along the customary tear line 32.

To remove an individual match, the flap 26 is lifted, a match is seized and torn off the base along the tear line 32. After the match 31 is removed, the guard flap 26 is again placed in the position shown to shield the remaining matches as the match just extracted is ignited.

The match 31 includes, in conventional fashion, a wooden or paper stick 36, or splint, having formed on the upper end thereof a head 37 of combustible material, of a composition well known in the match art.

A distinguished characteristic of the present invention is the provision of a sharp point 41 at the extreme tip of the match head, this feature being at variance from the rounded contour found in matches heretofore used.

The match head material is hard. Consequently, the sharp point 41, or stylus, is hard, and very rigid, although somewhat brittle.

The configuration and hardness of the stylus 41 is such that as it is inserted at the starting end 43 of a sound track 44 on the diaphragm 15, and is moved along the track in a right-hand to left-hand direction, as appears most clearly in FIGURE 1, and as is indicated by the arrow 45, the stylus causes the diaphragm 15 to vibrate in accordance with the waves or configurations impressed upon the sound track.

While FIGURES 1 and 2 show a sound track 44 formed directly into the diaphragm wall 15, it is clearly to be understood that the sound track 44 can also be formed on a separate thin sheet of plastic material suitably affixed to the outside of the diaphragm panel 15.

While the sound track 44 can be of the "hill and dale" variety, it is, in its preferred form, of the variable area kind, similar to the conventional phonograph record track, although linear rather than circular or spiral in path configuration.

The sound track 44 is long enough to reproduce a short information message when the match is drawn along, or swept along, the track at or somewhat less than conventional match striking speed.

As the stylus 41 proceeds along the track 44, the diaphragm 15 is subjected to vibrations reproducing the sounds impressed on the track. These vibrations are magnified and made audible as the diaphragm vibrations resonate in the hollow sound chamber 16, the chamber dimensions being selected so as to afford maximum amplification and desired sound qualities within space limitations.

Upon reaching the terminal end 48 of the sound track 44, the match encounters an ignition zone 46, or ignition strip, or ignition cover, comprising material of the kind conventionally used to ignite match heads of the particular variety employed therewith.

As the match completes its course through the sound track, producing its attendant sound, the combustible match tip 41 frictionally sweeps across the ignition strip 46 and is ignited. After use, the expended match is discarded.

The sound track is fabricated from a material such that at or near the time the last match is used, the sound track is quite worn. In other words, since the item is expendable, the sound track need only be formed with this limitation in mind.

As has previously been alluded to, more than one sound track can be used on the face of the diaphragm 15.

In the arrangement shown in FIGURE 3, for example, two sound tracks 54 and 55 have been formed in a substrate 56 of sound track material mounted on a diaphragm panel 57, thus forming an activating member impressing sound vibrations on the adjacent hollow sound chamber.

In the form of the device illustrated in FIGURES 3 and 4, the triangular-in-section tracks 54 and 55 do not terminate at the beginning of the ignition zone 66. Instead, the tracks 54 and 55 carry on or extend through the ignition strip, the match path traversing not only the path from the beginning location 71 to the terminal location 72, but also from the sound track terminal location 72 to the ultimate departure end 73.

In passing through the path 71 to 72, sound is created. In its passage beyond the terminal sound location 72, however, the match head strikes, or is ignited.

This result is effected by use of a match splint 76 (see FIGURE 4) formed with a combustible head 77 having a generally spherical configuration, but with a flattened lower portion affording an annular shoulder 78 suitable for relatively extensive frictional engagement with the underlying friction strip 66 of ignition material.

The end of the head 77 is provided with a sharp stylus 81, or needle, adapted to engage with, and produce sounds in conjunction with the paths 54 or 55 when being swept therethrough. Upon reaching and passing beyond the terminal ends 72 of the sound tracks, the match shoulders 78 engage frictionally with the subjacent portions of the ignition strip 66 and the match is thereby ignited. The track depth is sufficient to accept the stylus without interference to the engagement between the shoulders 78 and the ignition strip 66.

As can most clearly be seen in FIGURE 4, the considerable area of frictional engagement between the match head shoulders 78 and the underlying ignition zone 66 provides substantially greater face to face contact than is afforded in match books and boxes of the kind heretofore employed, and, as a consequence, a considerably improved combustion is effected.

It can therefore be seen that we have provided a match book device which is not only highly reliable in operation, but which also gives an audible message immediately prior to striking of the match, a single sweep of the match being effective to yield both results.

What is claimed is:
1. A talking match device comprising:
  (a) an elongated panel having formed on one side thereof at least one substantially linear elongated sound track;
  (b) an ignition layer on said panel adjacent one end thereof; and,
  (c) a plurality of matches mounted on said panel, each of said matches including a combustible head portion and a tip portion projecting from said head portion for sound producing engagement with said track as said match is swept along said track from the other end of said panel toward said one end thereof, with said combustible head portion igniting as said match traverses said ignition layer.

2. The device of claim 1 further characterized by an elongated hollow sound chamber box with said panel forming one wall thereof.

3. The device of claim 2 wherein said plurality of matches is mounted on another wall of said box, and wherein said device further includes a foldable cover mounted on said box, said cover being effective at least partially to enclose said matches in folded position of said cover.

4. A device as in claim 3 wherein said sound track is of the hill and dale variety.

5. A device as in claim 3 wherein said sound track is of the variable area variety.

6. The device of claim 1 wherein said combustible head portion and said tip portion are of the same material.

References Cited by the Examiner

UNITED STATES PATENTS

| | | | |
|---|---|---|---|
| 1,067,326 | 7/1913 | Fairburn | 44—42 |
| 2,271,155 | 1/1942 | Rapaport et al. | 206—29 |
| 2,724,388 | 11/1955 | Mabry | 44—42 X |

FOREIGN PATENTS 1,236,171  7/1959  France.

THERON E. CONDON, *Primary Examiner.*

LOUIS G. MANCENE, *Examiner.*

J. M. CASKIE, *Assistant Examiner.*